Jan. 9, 1923.
L. E. SLAUSON.
TRACTION WHEEL.
FILED JUNE 12, 1919.
1,441,303.
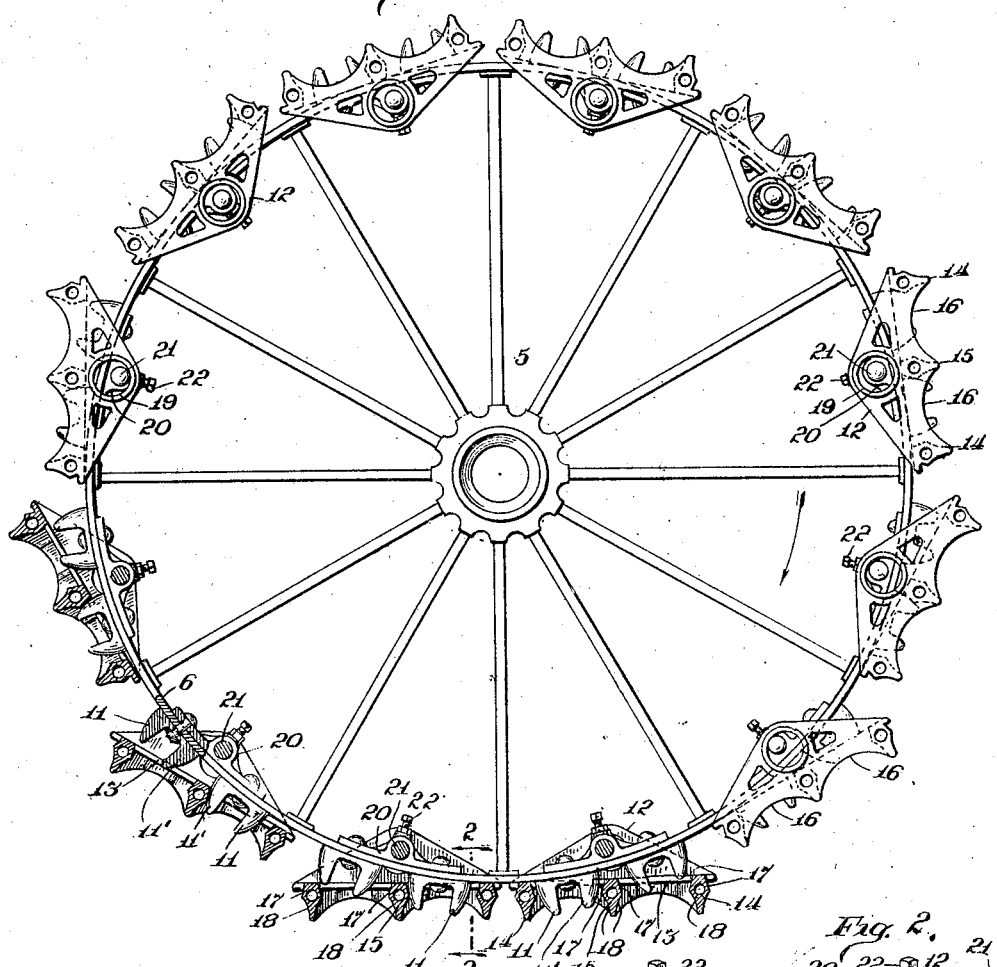
Fig. 1.
Fig. 2.
Fig. 3.
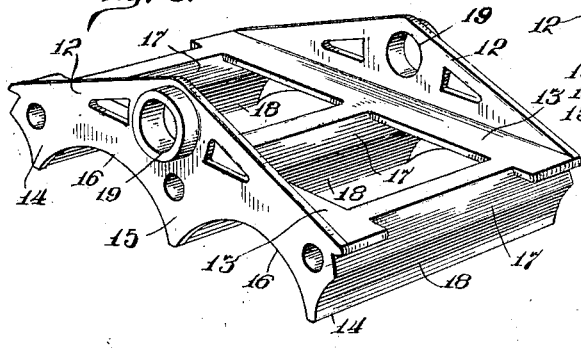
Inventor
Louis E. Slauson
By
Attorney.

Patented Jan. 9, 1923.

1,441,303

UNITED STATES PATENT OFFICE.

LOUIS E. SLAUSON, OF ROCK ISLAND, ILLINOIS, ASSIGNOR TO GRID-IRON-GRIP COMPANY, OF ROCK ISLAND, ILLINOIS.

TRACTION WHEEL.

Application filed June 12, 1919. Serial No. 303,642.

*To all whom it may concern:*

Be it known that I, LOUIS E. SLAUSON, a citizen of the United States, residing at Rock Island, in the county of Rock Island and State of Illinois, have invented certain new and useful Improvements in Traction Wheels, of which the following is a specification.

The object of this invention broadly is to convert an ordinary smooth rim wheel into a traction wheel by the application thereon in a novel manner of a plurality of traction shoes so constructed and so mounted on the rim of the wheel that as the wheel revolves they will automatically adjust themselves in proper position for forward or reverse travel to lay a smooth and practically unbroken track over which the rim of the wheel travels smoothly and evenly and without slippage.

More particularly the invention has for its objects to provide a traction shoe of simple form and substantial construction which can be produced at low cost as a one-piece casting and easily applied to the rim of a tractor or other similar wheel; to mount the shoes in a novel manner on the wheel rim so that notwithstanding they are independently movable relatively to the rim and to each other they will always be presented flatwise to the ground surface in regular spaced position to form a track upon which the rim travels smoothly and evenly; to provide parts of novel form on the rim for engaging the shoe to insure proper positioning of the shoes and which will also operate to free the shoe from any clods which may adhere to the shoe in traveling over soft ground; to provide the shoe with cross-bars of novel construction spaced apart to engage the ground surface and which will enter and leave soft ground without materially injuring the surface and without causing any lateral shifting of the earth between the cross-bar marks therein; and to construct the shoe so that the wheel may travel over hard pavements without injury thereto and over soft ground without sinking deeply therein.

In the accompanying drawings I have illustrated my invention in a form which I have found to be satisfactory in actual use, and referring thereto:

Fig. 1 is an elevation, partly in section, of a traction wheel embodying a preferred form of the invention.

Fig. 2 is a transverse sectional view on line 2—2 of Fig. 1.

Fig. 3 is a perspective view of the shoe.

Referring to the drawings 5 designates generally a metal wheel which may be of any usual construction provided with a rim 6. My invention is adapted to be applied to old wheels as well as to new wheels and I contemplate that wheel manufacturers in the future will punch the rims of their wheels so that my invention may be applied to the rims by the tractor manufacturer or by the purchaser as and when desired. And while the invention may be readily removed from the wheel if no longer required I particularly direct attention to the fact that this is not necessary for travel on hard pavements or road beds, as it is with some of the lug devices which are detachably applied to traction wheels, because the shoes will not dig into or otherwise injure a hard surface since they have no lateral movement on the surface.

A plurality of teeth are bolted, riveted or otherwise securely fastened to the rim in pairs at spaced intervals. These teeth are shorter than the width of the rim and they are located centrally of the rim as shown in Fig. 2. Each tooth comprises a substantially flat base 10 to engage the rim and connecting two longitudinal prongs 11, 11' spaced apart. The prongs of each tooth have substantially plane inner faces and outer faces which curve inwardly towards each other from the base so that the prongs taper, in effect, to their outer ground engaging edges. The tooth may be made of cast steel, chilled iron, or any other suitable material.

A traction shoe is loosely mounted on the face of the rim by means located at the back of the rim between the teeth of each pair. The shoe is preferably a one-piece steel casting but it can be cast in parts suitably assembled, or made of any other material. The shoes are all made alike, in grid or skeleton form, and each comprises parallel sides 12, inwardly directed longitudinally extending track flanges 13, end cross-bars 14, and an intermediate cross-bar 15. The sides are cut out at 16 between the cross-bars, and the flanges 13 extend inwardly closely adjacent to the ends of the teeth, Fig. 2. The cross-bars are preferably made substantially wedge-shaped in cross section and cored to reduce weight. Each cross-bar has oppositely inclined upper sides 17 and inwardly curved lower sides 18.

The sides 12 of the shoe extend above the flanges 13 sufficiently to inclose the side edges of the rim 6, and are provided with openings 19 disposed opposite each other. Bearings 20 are fastened to the back of the rim and carry transverse pins 21 which are adjustably secured in the bearings by set screws 22 and project outwardly to engage the openings 19 in the sides of the shoe. The openings are circular in shape and of considerably greater diameter than the diameter of the pins and they are spaced from the flanges 13 so that the shoe may move freely relatively to the pin and to the rim within limits determined by the openings and the pins, and also by the teeth and the cross-bars. The middle cross-bar 15 of the shoe is located between the teeth 7 of a pair and the parts are so proportioned that the shoe will have the desired amount of loose play relative to the rim with the middle cross-bar engaging the oppositely disposed sides of the pair of teeth and the end cross-bars engaging the outer sides of the teeth in the play of the shoe. Thus the shoe is freely movable within certain fixed limits on the rim and is induced to move by gravity and by the engagement of the teeth and cross-bars so that each shoe will be presented in a substantially horizontal position to the surface over which the wheel travels, and will be picked up in a substantially horizontal position from said surface after the radial center of the wheel has passed thereover.

In practice the teeth are disposed in pairs spaced equidistant around the rim and the shoes are then applied as shown in the drawings or in some equivalent manner. The parts are so proportioned that when the rim is completely equipped with teeth and shoes the ends of the shoes may approach each other in close juxtaposition, but without touching. Thus each shoe is at all times freely movable without interfering with or interference from either adjacent shoe. The wheel may be equipped with my invention at the factory and sold in its complete form, or the shoes and other parts may be sold separately in standard sizes for application to the wheel at any time. The simplicity of the invention makes it possible for anybody to apply the shoe and other parts to a wheel in the first instance and to remove and re-apply them as often as desired. It may be necessary to construct the parts of my invention in different sizes to fit wheels of different sizes but I believe that a comparatively few standard sizes will suffice.

The shoes travel with the rim of the wheel as the wheel revolves and move freely, by gravity and by reason of the engagement of the teeth with the cross-bars, to any position within their prescribed limits of movement, but they always maintain their position on the rim relative to each other and do not interfere or overlap at any time. Each shoe is engaged flatwise with the surface over which the wheel travels, that is to say, the shoe is presented horizontally to the surface so that by the time the rim travels thereon the shoe is at rest on the surface with all cross-bars thereof in engagement with the surface. Hence, if the cross-bars are forced into the surface by the weight carried by the wheel they will enter the surface evenly and make clean cuts without shifting the earth between these cuts. The flanges and the cross-bars provide an extended track surface for engagement with the rim so that the weight carried by the wheel is distributed over a considerable area which reduces the penetration of the cross-bars in the surface.

By reference to the drawings, it will be noted that before the wheel rim has rolled from one shoe another shoe will be properly positioned to receive it, and since the shoes are thus positioned in close juxtaposition and in alinement there is provided a sectional track which is carried by the rim and laid as the wheel travels and forming, to all intents and purposes, a continuous track for the rim. Each shoe is laid flat upon the ground before it receives the weight of the wheel and this is important because it prevents the shoe from digging in the ground at one end as would happen if the weight were applied to that end before the rest of the shoe was properly placed on the ground. Furthermore, this provides for distributing the weight over the entire area of the shoe, whereby one shoe will lie flush, or substantially flush, with the next and provide a track which may for various reasons incline like the grade of a street pavement but which will always be smooth and even and which will prevent the wheel from packing plowed ground.

The shape of the shoe and its transverse bars, and the teeth, and the cooperative relation of the teeth and shoes, all serve their part in keeping the shoes clean and free from dirt clods, especially when plowing in soft ground. This is, of course, desirable to maintain the shoes at their highest efficiency. The ground engaging portions of the transverse bars of the shoe are tapered so that they will make a narrow clean cut in the ground and withdraw therefrom without dragging dirt with them. It has been found in actual use that the shoes will keep clean,—that is to say, free from clods or accumulation of dirt which would interfere with their proper operation,—under all ordinary conditions, and this is due, as before indicated, very largely to the shape of the bars which are, in effect, self-cleaning. There will be a tendency, of course, in wet or very soft ground, for the dirt to stick to the shoes in clods of more or less size, but due to the movable mounting of the shoes on the rim and the cooperative action of the shoes and teeth while the shoes travel with the rim, during which travel it will be noted that the shoes shift endwise on the rim, there is no liability of the shoes ever becoming clogged with dirt to such an extent that they will not be properly presented to the ground under any ordinary conditions. This is a very important feature of my invention and particularly because of the simple manner in which the result is accomplished.

It has also been found in the practical use of the invention that it entirely eliminates slippage,—at least so far as can be observed with the eye. This is also important because it is a fact, although it may appear extraordinary, that in a day's plowing the loss of distance due to slippage will be considerable, in fact it may exceed ten per cent. This also involves a loss of fuel and time, besides the wear and tear on the machinery. Tractors equipped with this invention have been carefully watched on soft and on hard ground and on turf and no evidence of any material slippage has been observed. When it is understood that a tractor wheel with cleats or lugs will show slippage so plainly that critical examination is not necessary, and will shift the ground between cleats or spurs laterally in clods, the importance of my invention will be better appreciated.

I am aware that changes in the form and proportion and arrangement of parts of my invention may be made without departing from the spirit or sacrificing the advantages thereof and I therefore reserve the right to make all such changes as fairly fall within the scope of the following claims.

I claim:

1. A traction shoe for attachment to the rim of a wheel and having a plurality of transverse ground engaging bars wedge-shaped in cross section and with openings through the shoe between said bars.

2. A traction shoe for attachment to the rim of a wheel and having a plurality of transverse ground engaging bars spaced apart and with openings through the shoe therebetween, said bars tapering transversely to their outer edges.

3. A traction shoe for attachment to the rim of a wheel and having a plurality of transverse ground engaging bars spaced apart and with openings therebetween, said bars having oppositely inclined and curved sides.

4. A traction shoe for attachment to the rim of a wheel and having a plurality of transverse ground engaging bars spaced apart and with openings through the shoe therebetween, said bars having outwardly curved sides.

5. A traction shoe for attachment to the rim of a wheel and having a plurality of transverse ground engaging bars spaced apart and with openings through the shoe therebetween, said bars having oppositely inclosed sides.

6. A traction shoe for attachment to the rim of a wheel and having a plurality of transverse ground engaging bars spaced apart and with openings through the shoe therebetween, said bars having outwardly inclined sides.

7. A traction shoe for attachment to the rim of a wheel and having a plurality of transverse ground engaging bars spaced apart, the lower portion of each bar being substantially wedge-shaped in cross section.

8. A traction shoe for attachment to the rim of a wheel and having a plurality of transverse ground engaging bars spaced apart, said bars having oppositely inclined upper sides and being substantially wedge-shaped in cross section therebelow.

9. A traction shoe for attachment to the rim of a wheel and having a plurality of transverse ground engaging bars spaced apart, said bars having outwardly inclined upper sides and oppositely curved lower sides.

10. A traction shoe for attachment to the rim of a wheel and having a plurality of transverse ground engaging bars spaced apart and with openings therebetween, the upper sides of adjacent bars being oppositely inclined and the lower sides of adjacent bars being oppositely curved.

11. A traction shoe for attachment to the rim of a wheel and having a plurality of transverse ground engaging bars spaced apart, longitudinally extending flanges to form a track to be engaged by the outer surface of the rim, and sides connected to said bars and flanges and having alined openings therein spaced from said bars and flanges.

12. The combination with the rim of a wheel, of a traction shoe mounted on the rim and having transverse ground engaging bars, sides extending inwardly beyond the rim and provided with alined openings, and means on the back of the rim loosely engaging said openings to secure the shoe to the rim.

13. The combination with the rim of a wheel, of a traction shoe mounted on the rim and having transverse ground engaging bars, sides extending inwardly beyond the rim and provided with alined openings, and means on the back of the rim engaging said openings and of less diameter than the diameter of the openings to loosely secure the shoe to the rim.

14. The combination with the rim of a wheel, of a traction shoe mounted on the rim and having transverse ground engaging bars, sides extending inwardly beyond the rim and provided with enlarged alined openings, and pins mounted on the back of the rim and loosely engaging said openings to secure the shoe to the rim.

15. The combination with the rim of a wheel, of a traction shoe mounted on the rim and having transverse ground engaging bars, sides extending inwardly beyond the rim and provided with enlarged alined openings, bearings secured to the back of the rim, and pins mounted in said bearings and loosely engaging said openings to secure the shoe to the rim.

16. The combination with the rim of a wheel, of a traction shoe mounted on the rim and having transverse ground engaging bars with openings therebetween, teeth on the outer face of the rim operating in said openings, sides on the shoe extending inwardly beyond the rim and provided with enlarged alined openings, and pins on the back of the rim loosely engaging said openings to secure the shoe to the rim.

17. The combination with the rim of a wheel, of a traction shoe mounted on the rim and having transverse ground engaging bars with openings therebetween, means for securing the shoe on the rim, and teeth secured on the outer face of the rim to engage the openings in the shoe, said teeth having spaced prongs with substantially plane inner faces and curved outer faces.

18. The combination with the rim of a wheel, of a traction shoe mounted on the rim and having transverse ground engaging bars with openings therebetween, sides extending inwardly beyond the rim and provided with enlarged alined openings, pins of less diameter than the diameter of said openings engaging said openings to loosely secure the shoe to the rim, and teeth mounted on the face of the rim and arranged in the openings in the shoe.

LOUIS E. SLAUSON.

Witnesses:
MILDRED HINDERER,
HENRY J. BESELIN.